United States Patent [19]

Nielsen et al.

[11] 4,142,968

[45] Mar. 6, 1979

[54] DIATOMACEOUS EARTH FILTERAID AND METHOD FOR ITS MANUFACTURE

[75] Inventors: Richard B. Nielsen, Irvine; Charles J. Vogelsang, Cerritos, both of Calif.

[73] Assignee: Grefco, Inc., Los Angeles, Calif.

[21] Appl. No.: 849,873

[22] Filed: Nov. 9, 1977

[51] Int. Cl.² ............................................. B01D 15/06
[52] U.S. Cl. .................................. 210/32; 210/38 R; 210/79; 210/81; 252/449
[58] Field of Search ..................... 210/30 R, 32, 38 R, 210/79, 81; 426/422, 423; 252/449, 413

[56] References Cited

U.S. PATENT DOCUMENTS

| Re. 20,844 | 9/1938 | Calvert et al. | 252/449 |
| 665,652 | 1/1901 | Enzinger | 210/501 |
| 1,992,547 | 2/1935 | Schuetz | 252/449 |
| 2,322,674 | 6/1943 | Thomas | 252/449 |
| 2,701,240 | 2/1955 | Bregar | 252/449 |
| 3,013,981 | 12/1961 | Riede | 252/449 |

*Primary Examiner*—Frank Sever
*Attorney, Agent, or Firm*—Brian G. Brunsvold; Herbert H. Mintz; Everett H. Murray, Jr.

[57] ABSTRACT

A method is provided for treating diatomaceous earth filteraids having a beer-soluble iron content of less than about 0.01% to further reduce the beer-soluble iron content by maintaining the filteraids in contact with a relatively small volume of an acid. In the filteraids so produced, the beer-soluble iron content can be reduced by as much as 70% to 100%. In making the filteraids of this invention, sulfuric acid in about 0.1 to about 3.0 normal solution can be used to treat the starting filteraids.

24 Claims, No Drawings

DIATOMACEOUS EARTH FILTERAID AND METHOD FOR ITS MANUFACTURE

This invention relates to the manufacture of diatomaceous earth filteraids. More specifically, this invention relates to a method of reducing the beer-soluble iron content of diatomaceous earth filteraids and the filteraids produced thereby.

BACKGROUND OF THE INVENTION

Diatoms are microscopic, unicellular aquatic plants which are distinguished by an opaline silica shell. Upon dying, the diatoms sink to the bottom of the water and the shells form a bed which may be several hundreds of feet thick. These beds may eventually elevate above the surrounding water level, and through prolonged and repeated leaching, become purified. Material from these beds is called diatomaceous earth or diatomite.

The remarkable properties of diatomaceous earth make it industrially useful. Its inertness and various shapes make it an excellent filteraid and as such it is used extensively throughout the world.

In filteraid manufacture, diatomaceous earth is mined by the open quarry method, transported to a mill, crushed, screened, and put into storage bins. Material from these bins is dried, extraneous material such as clay and chert is removed, and the diatomaceous earth ore is then calcined in a rotary kiln. After calcining the filteraid is milled, classified, bagged, and shipped to the customer.

Filteraids are generally divided into two types according to the method of calcination. In one method, straight calcining, milled diatomite from the storage bins is passed through a rotary calciner. The resulting products are called "pinks" or calcined diatomaceous earth. In the other method, flux-calcining, the purified crude from the storage bin is mixed with a flux, usually sodium carbonate, and passed through a rotary calciner. The resulting products are called "whites" or flux-calcined diatomaceous earth. Both white and pink filteraids are used extensively in the brewing and pharmaceutical industries.

Diatomaceous earth filteraid materials normally contain iron in various forms, one or more of which may be soluble in the liquid being filtered. In the brewing of beer, for example, the beer is preferably clarified by filtering through diatomaceous earth filteraid material. However, the iron content of the normal filteraids which is soluble in beer has a deleterious effect on the beer.

The presence of iron in beer is widely known. W. P. K. Findlay, *Modern Brewing* 256 (1971) establishes that the presence of iron in beer in excess of several micrograms per gram can cause a severe decline in stability or shelf life. Similarly, soluble iron affects the stability of various pharmaceuticals and distilled spirits. C. J. King, *Separation Processes* 18 (1971). Reduction of beer-soluble iron in diatomaceous earth filteraids prolongs the shelf life of the beer.

In view of the value of the diatomaceous earth filteraids in the clarification of beer in the brewing process, there has been a great deal of interest over a long period of time in economical and efficient way and means for removing the beer-soluble iron from the filteraid material or changing the form of the iron content so as to render it substantially insoluble in beer.

It was discovered, for example, that by some internal chemical process, a certain percent of the beer-soluble iron becomes insoluble to the beer, merely by the aging of the filteraids before use in the brewing process. During aging of the filteraid for approximately one month, up to 20% of the beer-soluble iron may be rendered beer-insoluble.

U.S. Pat. No. 665,652 to Enzinger describes a process for producing a diatomaceous filteraid useful for filtering beer. The diatomite is heated in an aqueous solution of twenty percent hydrochloric acid and one percent nitric acid for some hours in an autoclave at a temperature of about 120° C. The steps of filtering, washing and pressing follow. However, the process fails to reduce beer-soluble iron to the extremely low levels sufficient to meet the more sophisticated demands of today's beer producer.

Without focusing specifically on the reduction of beer-soluble iron content, others have sought to reduce water and acid-soluble iron contents of diatomaceous earth filteraids. U.S. Pat. No. 2,701,240 to Bregar discloses a process to reduce acid-soluble iron content in diatomite filteraids from about 3 percent to less than 0.02 percent, with one example reporting reduction to 0.005 percent. The process includes flux-calcining followed by contacting with acid, heating and agitating from fifteen minutes to several hours, filtering, preferably washing, drying and sometimes milling. Preferably, excess of acid is employed. The examples in the Bregar specification indicate that the amount of acid used is about 600 percent by weight based on dry filteraid weight. The process does not employ calcined diatomaceous earth filteraids.

U.S. Pat. No. 1,992,647 to Schuetz describes a method of producing a diatomaceous earth filteraid with less than 0.03% water-soluble material. The preferred embodiment of the process includes treating comminuted, but not calcined, diatomaceous earth with a strong mineral acid, suitably sulfuric acid, leaching with water, drying, milling, calcining, treating with a dilute mineral acid, leaching, drying and milling.

All of these prior art methods fail to reduce beer-soluble content in diatomaceous earth filteraids to the extremely low levels desired in the brewing industry. Further, the methods involve either processing for a considerable period of time or otherwise complicated and expensive procedure. Most of the methods also employ leaching processes to remove impurities.

Accordingly, a primary object of the present invention is to efficiently and economically reduce beer-soluble iron in diatomaceous earth filteraids to an extremely low level to meet the more sophisticated demands of today's beer producer.

A further object is to provide a process of adding small quantities of a dilute acid solution to the filteraid to tie-up the beer-soluble iron rather than to remove it. The fact that the small residual acid used is allowed to stay with the product further reduces the processing cost.

SUMMARY OF THE INVENTION

These and other objects which will become apparent hereinafter are achieved by the present invention which provides a method for producing diatomaceous earth filteraids with greatly reduced levels of beer-soluble iron comprising the steps of mixing diatomaceous earth filteraids having an initial beer-soluble iron content of less than about 0.01% or 100 parts per million with a volume of aqueous acid solution sufficient, but preferably not in excess, to wet the filteraids uniformly and then maintaining the acid in contact with the filteraid for a period of time sufficient to reduce the beer-soluble iron content of the filteraid. The acid used is one which reduces beer-soluble iron content within seven days when applied as a 3.0 normal aqueous solution to a diatomaceous earth filteraid in an amount of 15% by weight based on the weight of the dry filteraid.

Preferably, the acid used is sulfuric acid having a relatively low acid concentration and is used in relatively small volume. The minimum amount of acid required to obtain a satisfactory reduction in the beer-soluble iron is in the order of magnitude of about 4 gram equivalents per ton of filteraid. It is preferred that the small amount of acid remaining at equilibrium is allowed to stay with the filteraid to reduce the processing costs.

Therefore, such expensive and time consuming steps as leaching, washing and drying may be avoided. Alternatively, the filteraids may be dried. Rather than leaching to remove impurities, the present process involves utilizing an acid to tie-up and iron and/or render it inactive.

The diatomaceous earth filteraids produced by this process are important in many industries, particularly the brewing and pharmaceutical industries, where soluble iron has a detrimental effect on product shelf life.

With certain acids, the beer-soluble iron content of the flux-calcined diatomaceous earth filteraids employed in this process is instantaneously reduced from 70% to 100%. During the course of reaction, the filteraid may be packaged and shipped to the customer. Alternatively, the filteraid may be dried almost immediately in a pneumatic or rotary dryer or some other commercial drying equipment and then packaged and shipped to customers.

In the case of calcined diatomaceous earth filteraids, the process requires about two weeks to reduce the beer-soluble iron content from 30% to 40%. The filteraid may be packaged and warehoused during this time and then shipped to the consumer.

The present invention consists of the processes and articles set forth herein and in the appended claims. It is to be understood that both the foregoing general description and the following detailed description are exemplary and explanatory, but are not restrictive of the invention.

DETAILED DESCRIPTION OF THE INVENTION

In accordance with the present invention, and as embodied herein, there is provided a method including the steps of mixing diatomaceous earth filteraid of a beer-soluble iron content less than about 0.01% with a volume of aqueous acid solution sufficient, but not in excess, to wet the filteraids uniformly and maintaining the acid in contact with the filteraids for a period of time sufficient to reduce the beer-soluble iron content of the filteraid.

Both flux-calcined and calcined diatomaceous earth filteraids may be employed as starting materials. As mentioned earlier, calcined diatomite filteraids are obtained by passing milled diatomite through a rotary calciner. Preferably, flux-calcined filteraids are used. To produce flux-calcined diatomite filteraids, the purified crude from the storage bin is mixed with a flux, usually sodium carbonate, and passed through a rotary calciner.

This invention employs as a starting material diatomaceous earth filteraids with a beer-soluble iron content of less than about 0.01% or 100 parts per million. Preferably, the beer-soluble iron content is less than 0.005% or 50 parts per million. Flux-calcined or calcined diatomite filteraids of these levels of beer-soluble iron may be obtained by conventional techniques as described above.

For example, commercially available flux-calcined diatomaceous earth filteraids of the type "Dicalite Speedex" and "Dicalite Speedplus," and calcined diatomaceous earth filteraids of the type "231" may be used.

In keeping with the concept of the invention, the starting diatomaceous earth filteraids are wetted with an aqueous acid solution of a suitable inorganic or organic acid. A suitable acid is one which reduces beer-soluble iron content in seven (7) days when applied as a 3.0 normal aqueous solution to a diatomaceous earth filteraid in an amount of 15% by weight based on the weight of the dry filteraid.

In general, suitable acids will be moderately strong or strong inorganic or organic acids. Preferably, the acid is an inorganic acid, especially one chosen from the inorganic acid group consisting of sulfuric acid, hydrochloric acid, and nitric acid. Most preferably, the acid solution is sulfuric acid. Suitable organic acids include acetic acid and oxalic acid.

One of the advantages of the present invention is that a concentrated acid solution is nor required. In general, a relatively dilute solution is used in the practice of this invention. A suitable concentration of acid solution is at least in the order of magnitude 0.1 normal and, preferably, the concentration range is between about 0.2 normal and about 3.0 normal. About 1.0 normal is most preferred.

Another advantage of this invention is that large quantities of acid are not needed to reduce the beer-soluble iron content. The amount should be only that which is sufficient to evenly wet the filteraids. A suitable amount of acid solution is from about 2% to about 15% by weight based on dry filteraid weight. Alternatively expressed, this is from about 4 to about 400 gram equivalents of acid per ton of dry filteraid. The preferred amount of acid solution is 4% by weight based on dry filteraid weight.

To treat the filteraids, they are mixed with the relatively dilute solution of acid. Mixing may be accomplished by any suitable means, such as by the use of a ribbon blender.

The temperature at which the filteraids and the acid solution are mixed may be between room temperature and the boiling point of the acidic solution. Preferably, the mixing is accomplished at room temperature.

After mixing, the filteraids and the acid solution are maintained in contact for a time sufficient to reduce the beer-soluble iron content to the desired level. It is believed that the acid reacts or complexes with the iron to render it beer-insoluble since the reduction in beer-soluble iron content has been found to occur without leaching or washing. By the process of this invention, reduction of beer-soluble iron content can begin to occur almost immediately upon mixing the filteraids with the acid solution.

It has been found that with flux-calcined filteraids, a substantial reduction in beer-soluble iron content can occur instantaneously. In general, the reduction occurs over a period of from about one to about 5 hours. It has been found that the mixing can occur in the plant process just prior to the bagging operation. After mixing, the product is fed to the packer and bagged in the normal manner, with the net result being no change or interruption of the plant operation. Alternatively, the filteraids and acid solution are maintained in contact until the reaction reaches equilibrium. Flux-calcined filteraids are the preferred starting material.

For calcined diatomite filteraids, it is found that substantial reduction occurs in about seven to about fourteen days, usually in about fourteen days.

Generally, the small residual acid remaining may be allowed to stay with the filteraid. Since merely maintaining the acid solution and filteraids in contact, without continuous leaching or washing, achieves the reduction of beer-soluble iron content in accordance with the present invention, the filteraids wetted with acid solution can be packaged and stored for subsequent use or shipment, the reaction occurring without any further processing.

Alternatively, flux-calcined filteraids may be dried, such as in a pneumatic or rotary dryer, and then stored for subsequent use of shipment.

The following examples, in conjunction with the general and detailed description above, more fully illustrate the nature and character of the present invention. The examples are illustrative only and are not intended to limit the scope of the invention.

EXAMPLE 1

Flux-calcined diatomaceous earth filteraids of the grade "Speedex" having a beer-soluble iron content of less than 0.005% or 50 parts per million were mixed at room temperature in accordance with this invention with 7% solutions of 0.19 normal hydrochloric acid (Run 1) and 0.38 normal hydrochloric acid (Run 2) and beer-soluble iron content was monitored over a period of 35 days. The beer-soluble iron content was immediately reduced substantially in each case.

For comparison, the filteraids were mixed and maintained in contact at room temperature with 7% solutions of water (Run 3) and of 1 normal sodium hydroxide (Run 4). The effect on beer-soluble iron content of the water and basic solution treatments was significantly inferior to the acid treatments.

The results of the four runs of this Example are set forth below in Table I. Beer-soluble iron content is in parts per million.

TABLE I

| Run No. | Treatment | Beer-Soluble Iron Content Day | | | | | |
|---|---|---|---|---|---|---|---|
| | | 0 | 1 | 7 | 14 | 21 | 35 |
| 1 | 7% .19 Normal HCl | 41.2 | 12.8 | 13.2 | 16.0 | — | 16.0 |
| 2 | 7% .38 Normal HCl | 39.2 | 4.4 | 3.2 | 3.6 | 6.8 | 8.0 |
| 3 | 7% H2O | 40.0 | 36.0 | 32.0 | 30.8 | 29.2 | 25.2 |
| 4 | 7% 1 Normal NaOH | 40.0 | 65.5 | 51.2 | 28.8 | — | — |

The beer-soluble iron concentrations were determined in Schlitz beer using the American Society of Brewing Chemists' standard test method No. B-13, 11/6/72, Beer Soluble Iron In Filteraid. It is described as follows:

Scope

This is a colorimetric method for determination of beer-soluble iron in filteraids. Extraction is according to the American Society of Brewing Chemists — Filteraids-4, "Iron Pick-up by Beer". The iron is detected by the orange-red color developed by the addition of 1,10 phenanthroline, ASBC - Beer-18, "Iron".

Reagents & Equipment

1. FerroVer powder, 1,10 phenanthroline. (Cat. No. 303, Hach Chemical Company, Ames, Iowa)
2. Dispenser bottle, 0.1 gram delivery. (Cat. No. 466, Hach)
3. Standard iron solution. This can be used for STM A-1. It contains 0.000143 gms. of $Fe_2O_3$ or 0.1 mg. Fe/cc or 100 ppm Fe. Color standards representing an iron pick-up in beer of 0.1, 0.25, 0.5, 1.0, 1.5, 2.0, 2.5, 3.0 ppm Fe are prepared with degassed beer and read at 505 mu vs. a beer blank set at 100% transmittance. The readings are plotted on semi-logarithmic (2 cycle × 70 divisions) with % transmittance on logarithmic scale vs. ppm Fe pick-up in beer. This calibration should be checked whenever the instrument is repaired and/or once every 4 months.
4. Iron standard — HachVer — Cat. No. 908. One pillow in 25 mls. degassed beer yields a 1.0 ± 0.1 ppm solution of iron as Fe. These have proven to be excellent for fast checks on the instrument calibration between checks with the standard iron solution. Our work indicates results are accurate within ± 0.05 ppm Fe.
5. Degassed bottled beer (we use Schlitz).
6. Bausch & Lomb Spectronic 200 calibrated at 505 mu for beer base standards. Curve sensitivity should be controlled to between 20% and 80% transmittance for accuracy.
7. Glass funnel, 60°,125 mm. diameter.
8. Filter paper, 25 cm. in diameter, E & D 613, Whatman No. 1 or S and S No. 602.
9 Stop watch.

Procedure (A) Extraction

Adjust the temperature of 200 mls. of decarbonated beer in a 1000 ml. Erlenmeyer flask to 75° F. (room temperature). Add 5.0 grams of filteraid to the beer and start a stop watch at the moment of addition. Swirl the flask to put all of the filteraid into suspension. Allow the filteraid to settle and swirl the flask again at 1, 2, 3, 4, and 5 minutes of elapsed time, allowing the filteraid to settle after each swirling. Swirl the flask again at 5 minutes and 50 seconds, and immediately transfer the entire suspension to a funnel fitted with an iron-free filter paper.

Discard the filtrate collected during the first 30 seconds. Collect filtrate in a clean beaker for the next 150 seconds and determine the iron content of the filtrate as in B below. Also treat 200 mls. of beer without filtraid in the same manner for use as the instrument blank.

(B) Iron Determination

1. B & L Spectronic 20 is calibrated at 505 mu from 0 to 3 ppm Fe/unit (1 ml.) vs % transmittance. Beer blank must be used for 100% transmittance sample in all testing.
2. Measure 25 mls. of sample in a graduated cylinder and pour into a clean 125 Erlenmeyer flask or 100 ml. Griffin beaker.
3. Add 0.1 grams (one measure from the dispensing bottle) of FerroVer to the sample. Swirl to mix. Let the sample stand for 2 minutes, but no longer than 5 minutes before comparing color. Keep samples out of direct sunlight.

4. Measure the color by reading transmittance of the sample using a ½" B & L photometric test tube. This gives a chart reading in ppm Fe pick-up/ml. of beer.

5. To obtain the amount of beer-soluble iron in 5 gms. of filteraid in 200 mls. of beer, you must multiply the reading × 40. Thus, 0.8 ppm Fe (reading) × 40 = 32 ppm (0.032 mg.) beer soluble iron in the filter aid sample.

EXAMPLE 2

Calcined diatomaceous earth filteraids of the grade "231" having a beer-soluble iron content of 0.0016%, i.e., 16 parts per million, were mixed, in accordance with this invention, with a 7% solution of 0.38 normal hydrochloric acid (Run 1) at room temperature and beer-soluble iron content was monitored for fourteen days. Notwithstanding the low starting level of the beer-soluble iron content, this treatment resulted in a reduction of the beer-soluble iron content.

For comparison, the filteraids were mixed and maintained in contact at room temperature with 7% solutions of water (Run 2) and of 1 normal sodium hydroxide (Run 3). The water treatment was not as effective as the acid treatment, and the treatment with basic solution actually caused a substantial increase in beer-soluble iron content.

The results of the three runs of this Example are set forth below in Table II. Beer-soluble iron content is in parts per million, and the method for beer-soluble iron content measurement is the same as was used in Example 1.

TABLE II

| Run No. | Treatment | Beer-Soluble Iron Content Day | | | | | |
|---|---|---|---|---|---|---|---|
| | | 0 | 1 | 7 | 14 | 21 | 35 |
| 1 | 7% .38 Normal HCl | 14.8 | 14.8 | 13.2 | 9.6 | — | — |
| 2 | 7% H$_2$O | 16.0 | 16.0 | 14.0 | 14.0 | 12.0 | 11.2 |
| 3 | 7% 1 Normal NaOH | 16.0 | 100.4 | 48.0 | 48.4 | — | — |

EXAMPLE 3

The effect of mixing various acids with the filteraid at room temperature was compared to the effect of addition of water and beer. A starting flux-calcined diatomaceous earth filteraid of the grade "Speedplus" was used in each case. The concentration of each acid was 0.5 molar and the amount of acid solution in each case was 4% by weight based on dry filteraid weight. The value of beer-soluble iron in the filteraid was measured at six days and at thirty-six days. The beer-soluble iron content measurement was the same as was used in Example 1 except that beer-soluble iron was measured in Budweiser beer rather than in Schlitz beer.

The initial beer-soluble iron content of the filteraid was 42 parts per million. The results are summarized in Table III. Beer-soluble iron is measured in parts per million. While organic acids such as acetic acid and oxalic acid were somewhat effective, others such as tartaric acid and citric acid actually showed a reverse effect. The reason for this is not known.

TABLE III

EFFECT OF VARIOUS ADDITIVIES ON THE BSI OF FLUX-CALCINED D. E. FILTERAIDS

| Additive | Formula | Beer-Soluble Iron | |
|---|---|---|---|
| | | 6 Days | 36 Days |
| Sulfuric Acid | H$_2$SO$_4$ | 5 | 7 |
| Nitric Acid | HNO$_3$ | 14 | 18 |
| Hydrochloric Acid | HCl | 15 | 19 |
| Acetic Acid | CH$_3$COOH | 15 | 21 |
| Oxalic Acid | HOOCCOOH-2H$_2$O | 21 | 15 |
| Beer | — | 34 | 27 |
| Water | H$_2$O | 35 | 22 |
| Lactic Acid | CH$_3$CHOHCOOH | 42 | 36 |
| None | | 42 | 40 |
| Boric Acid | H$_3$BO$_3$ | 47 | 45 |
| Tartaric Acid | HOOC(CHOH)$_2$COOH | 52 | 44 |
| Citric Acid | HOOC CH$_2$C(OH)-(COOH) CH$_2$COOH H$_2$O | 94 | 79 |

EXAMPLE 4

A series of tests were conducted to determine the most effective quantity of acid. As starting materials, two different flux-calcined diatomaceous earth filteraids of grades "Dicalite Speedplus" and "Dicalite Speedex" were utilized.

In the first series of tests, "Speedplus" filteraids were mixed at room temperature with amounts of hydrochloric acid solution varying from 2% to about 6% by weight based on dry filteraid weight. The concentration of the hydrochloric acid solutions varied from 0.10 normal to about 1.5 normal. For comparison, a test was run using water as the additive. For further comparison, a sample was run to determine the reduction in beer-soluble iron occurring merely from the passage of time with neither acid nor water being added.

The amount of beer-soluble iron (represented in Table IV as BSI) was measured four days after treatment by the same method disclosed in Example 1, with the exception that in these tests Budweiser beer was employed. There is a slight difference in value depending upon the beer used; however, the relative differences and the effect remains the same. The results are summarized in Table IV. The best results indicate about 60% to about 63% reduction in beer-soluble iron content.

TABLE IV

Effect of Acid (HCl) Quantity on Beer-Soluble Iron of Flux-Calcined D.E. Filteraids of Grade "Speedplus"

| Sample No. 126R-6 | gm Equivalents Acid Per Ton D.E. | Normal Conc. HCl | % Solution Added | BSI |
|---|---|---|---|---|
| IA | 0 | 0 | 0 | 44 |
| IB | 0 | 0 (H20 only) | 4 | 40 |
| IC | 3.6 | 0.10 | 4 | 40 |
| IE | 6.7 | 0.37 | 2 | 26 |
| ID | 7.2 | 0.20 | 4 | 38 |
| IF | 13.4 | 0.37 | 4 | 17 |
| IG | 20.2 | 0.37 | 6 | 17 |
| IH | 26.9 | 0.74 | 4 | 16 |
| II | 54.5 | 1.50 | 4 | 18 |

In Table IV, diatomaceous earth is abbreviated D.E. and values of BSI are in parts per million.

A second series of tests were run using the "Speedex" diatomaceous earth filteraid as a starting material. The filteraids were mixed at room temperature with amounts of hydrochloric solution varying from 2% to about 6% by weight based on dry filteraid weight. The concentration of the acid solution varied between about 0.1 normal and about 1.5 normal. Again, comparative tests were run to determine the effect of addition of water, without acid, and to evaluate the reduction in beer-soluble iron resulting from the mere passage of time. The amount of beer-soluble iron (represented in Table IV as BSI) was measured five days after treatment. The same method disclosed in Example 1 was utilized to measure the beer-soluble iron value except that Budweiser rather than Schlitz beer was used. The results are summarized in Table V. The best results indicate about 83% to 100% reduction in beer-soluble iron.

TABLE V

Effect of Acid (HCl) Quantity of Beer-Soluble Iron of Flux-Calcined D.E. Filteraids of Grade "Speedex"

| Sample No. 126R-6 | gm Equivalents Acid Per Ton D.E. | Normal Conc. HCl | % Solution Added | BSI |
|---|---|---|---|---|
| IIA | 0 | 0 | 0 | 24 |
| IIB | 0 | 0 (H$_2$O only) | 4 | 18 |
| IIC | 3.6 | 0.10 | 4 | 17 |
| IIE | 6.7 | 0.37 | 2 | 12 |
| IID | 7.2 | 0.20 | 4 | 17 |
| IIF | 13.4 | 0.37 | 4 | 4 |
| IIG | 20.2 | 0.37 | 6 | 3 |
| IIH | 26.9 | 0.74 | 4 | 2 |
| III | 54.5 | 1.50 | 4 | 0 |

In Table V, diatomaceous earth is abbreviated D.E. and values of BSI are in parts per million.

In general, the tests summarized in Tables IV and V indicate that the effectiveness of the acid is proportional to the quantity added. The minimum amount of acid required to obtain a satisfactory reduction in the beer-soluble iron appears to be in the order of magnitude of 5 gram equivalents of acid per ton of filteraid. In order to insure effectiveness, the acid should be added with at least 4% water; for example, an effective procedure appears to be to mix 4% of a 0.4 normal HCl solution with the diatomaceous earth.

EXAMPLE 5

The commercial viability of the process was tested at the plant level, again using hydrochloric acid. In the first test, flux-calcined diatomaceous earth filteraid of grade "Dicalite Speedex" was used as a starting material. Hydrochloric acid solution of 0.4 normal concentration, in an amount 4% by weight based on the dry filteraid weight was mixed with the filteraid. For comparison, a separate experiment mixing the "Dicalite Speedex" with water in the amount of 4% by weight based on the dry filteraid weight was performed.

The plant test was carried out using a crude homemade mixer (a ribbon blender would be desirable) and a spray manifold with several nozzles through which the water and acid solutions were metered into the filteraid. The operation was inserted into the plant process just prior to the bagging operation. After mixing, the product was fed to the packer and bagged in the normal manner. The operation was run continuously, thus causing no change or interruption to the plant operation.

The amount of beer-soluble iron (abbreviated in Table VI as BSI) was measured nineteen days after treatment by the method disclosed in Example 1 with the exception that Budweiser beer was used. The results are summarized in Table VI.

TABLE VI

Plant Test Using Acid Treatment To Reduce Beer-Soluble Iron of Flux-Calcined Diatomaceous Earth Filteraids

| | Dicalite Speedex | |
|---|---|---|
| Filteraid Treatment | Water | HCl acid |
| Initial BSI | 25 | 25 |
| BSI after 19 days | 17 | 4 |

The values of BSI are in parts per million. It is observed that an 84% reduction in beer-soluble iron occurred. An identical second test was run, with the sole exception that "Dicalite Speedplus" was used as the starting diatomaceous earth filteraid. The results, summarized in Table VII, indicate a 64.5% reduction in the beer-soluble iron content.

TABLE VII

Plant Test Using Acid Treatment to Reduce Beer-Soluble Iron of Flux-Calcined Diatomaceous Earth Filteraids

| | Dicalite Speedplus | |
|---|---|---|
| Filteraid Treatment | Water | HCl Acid |
| Initial BSI | 45 | 45 |
| BSI after 19 days | 29 | 16 |

EXAMPLE 6

A series of tests were run to determine the effect of sulfuric acid on beer-soluble iron of flux-calcined diatomaceous earth filteraids. "Dicalite Speedplus" diatomaceous earth filteraid was used as a starting material. The initial concentration of beer-soluble iron in the "Dicalite Speedplus" was 38.8 parts per million. The filteraids were mixed at room temperature with about 4% of about a 1.0 normal sulfuric acid solution. As is summarized in Table VIII, beer-soluble iron content of samples was measured immediately after mixing, and at one, two, three, four, and five hours after mixing. Sample No. 2 was measured after the filteraid had been oven-dried at 300° Fahrenheit for two hours after mixing. The amount of beer-soluble iron (represented in Table VIII as BSI) was measured by the same method disclosed in Example 1 except that Budweiser rather than Schlitz beer was used. The results from Table VIII indicate an instantaneous reduction of about 78% in beer-soluble iron content and a reduction of about 95% after five hours.

TABLE VIII

EFFECT OF H$_2$SO$_4$ ON BEER-SOLUBLE IRON OF FLUX-CALCINED D.E. FILTERAIDS

| Sample No. | Time After Mixing | BSI |
|---|---|---|
| 1 | Starting Material | 38.8 |
| 2 | After Mixing | 8.8 |
| 3 | Oven Dried at 300° F for 2 hours (after mixing) | 11.2 |
| 4 | One Hour | 8.0 |
| 5 | Two Hours | 5.2 |
| 6 | Three Hours | 3.6 |
| 7 | Four Hours | 2.8 |
| 8 | Five Hours | 1.6 |

In Table VIII, diatomaceous earth is abbreviated D.E. and values of BSI are in parts per million.

EXAMPLE 7

A series of tests were run to determine the effect of sulfuric acid concentration and weight-percent on reduction of beer-soluble iron content in diatomaceous earth filteraids. "Dicalite Speedplus" diatomaceous earth filteraid was used as a starting material. The initial concentration of beer-soluble iron in the "Dicalite Speedplus" was 38.8 parts per million. The filteraids were mixed at room temperature with solutions of sulfuric acid ranging in concentration from about 0.2 normal to about 3.0 normal. The weight-percent of the acid solution, compared to the weight of the diatomaceous earth filteraid, varied from about 2% to about 15%. As is summarized in Table IV, beer-soluble iron content of the diatomaceous earth filteraids was measured immediately after mixing and also one day after mixing. The amount of beer-soluble iron (represented in Table IX as BSI) was measured by the same method disclosed in Example 1 except that Budweiser rather than Schlitz beer was used. The best results from Table IX show an instantaneous reduction of about 81% in beer-soluble iron content and a reduction of about 96% after one day.

The results show that reductions in beer-soluble iron content increase in certain ranges as the concentration of acid is increased while holding constant the weight-percent volume of acid solution added. In other concentration ranges, at constant weight-percent volume, the use of lower concentrations is more beneficial. A similar observation can be drawn from the data of Table IV. In general, the amounts and concentration of acid solution used should optimize economics and results.

TABLE IX

Effect of $H_2SO_4$ Concentration and Weight-Percent on Beer-Soluble Iron in D.E. Filteraids

| Sample No. | Normal Concentration | % Added | gram equivalents Acid per ton DE | BSI[1] | BSI[2] |
|---|---|---|---|---|---|
| 1 | 0 | 0 | 0 | 38.8 | 38.8 |
| 2 | 0.2 | 4 | 7.3 | 29.2 | 25.6 |
| 4 | 0.4 | 4 | 14.5 | 16.0 | 13.2 |
| 6 | 0.8 | 4 | 29.1 | 15.2 | 5.6 |
| 7 | 1.2 | 4 | 43.6 | 13.2 | 7.6 |
| 8 | 2.0 | 4 | 72.6 | 7.2 | 5.6 |
| 10 | 3.0 | 4 | 109.0 | 42.8 | 7.2 |
| 3 | 0.4 | 2 | 7.3 | 29.2 | 25.2 |
| 5 | 0.4 | 15 | 54.5 | 21.2 | 4.0 |
| 9 | 3.0 | 2 | 54.5 | 24.0 | 15.6 |
| 11 | 3.0 | 15 | 408.6 | 72.0 | 1.6 |

[1]Measurement taken immediately after mixing.
[2]Measurement taken after one day.

In Table IX, diatomaceous earth is abbreviated D.E. and values of BSI are in parts per million.

The preferred embodiment and best mode of this invention presently contemplated by us is the mixing of 4% by weight, 1.0 normal solution of sulfuric acid with flux-calcined diatomaceous earth filteraids of less than 0.005% or 50 parts per million beer-soluble iron content. The filteraids are evenly wet by the acid solution and the reaction is allowed to proceed. The beer-soluble iron content is thereby reduced from 70% to 100%.

The invention in its broader aspects is not limited to the specific embodiments described. Certain modifications will be obvious to those skilled in the art and can be executed without departing from the scope and spirit of the invention and without sacrificing the principal advantages of the invention.

What is claimed is:

1. A process for producing diatomaceous earth filteraids of reduced beer-soluble iron content comprising the steps of mixing diatomaceous earth filteraids having a beer-soluble iron content of less than about .01% with an amount of aqueous acid solution, said acid being present in an amount less than about 15% by weight, based on the weight of dry filteraid, said acid being one which is capable of reducing said beer-soluble iron content within seven days when applied as a 3.0 normal aqueous solution to a diatomaceous earth filteraid in an amount of 15% by weight based on the weight of the dry filteraid; and maintaining the acid solution in contact with the teraids for a period of time sufficient to reduce the beer-soluble iron content of said filteraid by at least about 60%.

2. A process according to claim 1 wherein the amount of acid solution is from about 2% to 15% by weight based on the dry filteraid weight and the concentration of the acid solution is at least about 4 gram equivalents of acid per ton of diatomaceous earth filteraid.

3. A process according to claim 1 wherein the concentration of the acid solution is from about 4 gram equivalents of acid per ton of diatomaceous earth filteraid to about 400 gram equivalents of acid per ton of diatomaceous earth filteraid.

4. A process according to claim 1 wherein the acid is selected from the group consisting of acetic acid and oxalic acid.

5. A process according to claim 1 wherein the acid is an inorganic acid.

6. A process according to claim 5 wherein the acid is selected from the group consisting of sulfuric acid, nitric acid, and hydrochloric acid.

7. A process according to claim 6 wherein the acid is sulfuric acid.

8. A process according to claim 7 wherein the concentration of the sulfuric acid solution is from about 0.1 normal to 3.0 normal and the amount of said acid solution is from 2% to 15% by weight based on the dry filteraid weight.

9. A process according to claim 1 wherein the acid solution is maintained in contact with the filteraid for a period of time sufficient to reduce the beer-soluble iron content of said filteraid.

10. A process according to claim 1 wherein the acid solution is maintained in contact with the filteraids for a period of time between 0 and about 36 days.

11. A process according to claim 1 further including the step of drying the filteraid after contact with the acid solution.

12. A process according to claim 1 wherein the starting diatomaceous earth filteraids have a beer-soluble iron content of less than about 50 parts per million or .005%.

13. A process according to claim 1 wherein the starting diatomaceous earth filteraids are flux-calcined filteraids.

14. A process according to claim 1 wherein the starting diatomaceous earth filteraids are calcined filteraids.

15. A process according to claim 1 wherein the aqueous acid solution is mixed and maintained in contact with the diatomaceous earth filteraids at room temperature.

16. A process for producing diatomaceous earth filteraids of reduced beer-soluble iron content comprising the steps of mixing flux-calcined diatomaceous earth filteraids having a beer-soluble iron content of less than about .01% with an amount of aqueous acid solution of a strong or moderately strong inorganic acid of concentration of at least 4 gram equivalents of acid per ton of diatomaceous earth filteraid, said aqueous acid solution comprising less than about 15% by weight, based on the weight of dry filteraid, and maintaining the acid solution in contact with the filteraids for a period of time sufficient to reduce the beer-soluble iron content of said filteraid by at least about 60%.

17. A process according to claim 16 wherein said inorganic acid is one which reduces beer-soluble iron content within seven days when applied as a 3.0 normal aqueous solution to a diatomaceous earth filteraid in an amount of 15% by weight based on the weight of the dry filteraid.

18. A process according to claim 17 wherein the acid is selected from the group consisting of sulfuric acid, nitric acid and hydrochloric acid.

19. A process according to claim 17 wherein the acid is sulfuric acid.

20. A process according to claim 19 wherein the concentration of the acid solution is from about 0.2 normal to about 3.0 normal and wherein the amount of acid solution is from about 2% to 15% by weight based on the dry filteraid weight.

21. A process according to claim 20 wherein the amount of sulfuric acid solution is about 4% by weight based on the dry filteraid weight and wherein the reduction in the beer-soluble iron content is from 70% to 100%.

22. A process according to claim 17 further including the step of drying the filteraids after contact with the acid solution.

23. A process according to claim 17 wherein the starting diatomaceous earth filteraids have a beer-soluble iron content of less than about 50 parts per million or 0.005%.

24. A process according to claim 16 wherein the aqueous acid solution is mixed and maintained in contact with the diatomaceous earth filteraids at room temperature.

* * * * *

UNITED STATES PATENT OFFICE
CERTIFICATE OF CORRECTION

Patent No. 4,142,968                  Dated March 6, 1979

Inventor(s) RICHARD B. NIELSEN ET AL.

It is certified that error appears in the above-identified patent and that said Letters Patent are hereby corrected as shown below:

In col. 12, line 6, delete "teraids" and insert --filteraids--.

Signed and Sealed this

Twenty-sixth Day of February 1980

[SEAL]

*Attest:*

SIDNEY A. DIAMOND

*Attesting Officer*     *Commissioner of Patents and Trademarks*